US012087239B2

(12) United States Patent
Chang

(10) Patent No.: US 12,087,239 B2
(45) Date of Patent: Sep. 10, 2024

(54) METHOD FOR CONTROLLING SWITCHING OF MULTIPLEXER OF DISPLAY PANEL ACCORDING TO IMAGE CONTENT AND DISPLAY DRIVER CIRCUIT THEREOF

(71) Applicant: NOVATEK Microelectronics Corp., Hsin-Chu (TW)

(72) Inventor: Chieh-Hsiang Chang, Miaoli County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/197,111

(22) Filed: May 15, 2023

(65) Prior Publication Data

US 2023/0282175 A1 Sep. 7, 2023

Related U.S. Application Data

(63) Continuation of application No. 17/673,807, filed on Feb. 17, 2022, now Pat. No. 11,651,741.

(60) Provisional application No. 63/150,096, filed on Feb. 17, 2021.

(51) Int. Cl.
*G09G 3/3291* (2016.01)

(52) U.S. Cl.
CPC ..... *G09G 3/3291* (2013.01); *G09G 2310/027* (2013.01); *G09G 2310/0291* (2013.01); *G09G 2310/0297* (2013.01); *G09G 2330/021* (2013.01)

(58) Field of Classification Search
CPC .................................................. G09G 3/3291
USPC .................................................. 345/204
See application file for complete search history.

(56) References Cited

U.S. PATENT DOCUMENTS

2011/0025678 A1 2/2011 Chung
2017/0061928 A1 3/2017 Kim
2020/0135110 A1* 4/2020 Yokoyama ........... G09G 3/3266

FOREIGN PATENT DOCUMENTS

TW 201115543 A1 5/2011
TW 201426710 A 7/2014

* cited by examiner

*Primary Examiner* — Long D Pham
(74) *Attorney, Agent, or Firm* — Winston Hsu

(57) ABSTRACT

A display driver circuit is configured to drive a display panel having a multiplexer. A method for the display driver circuit includes steps of: sending, by the display driver circuit, a plurality of first data voltages to the display panel through a switch of the multiplexer; and outputting, by the display driver circuit, a control signal to the switch during a first period in which the plurality of first data voltages sent through the switch remain unchanged, wherein the control signal controls the switch to be turned on and keep in a conducted status until the display driver circuit sends a second data voltage different from the plurality of unchanged first data voltages through the switch.

10 Claims, 10 Drawing Sheets

METHOD FOR CONTROLLING SWITCHING OF MULTIPLEXER OF DISPLAY PANEL ACCORDING TO IMAGE CONTENT AND DISPLAY DRIVER CIRCUIT THEREOF

CROSS REFERENCE TO RELATED APPLICATIONS

This application is a continuation application of U.S. application Ser. No. 17/673,807, filed on Feb. 17, 2022, which claims the benefit of U.S. Provisional Application No. 63/150,096, filed on Feb. 17, 2021. The contents of these applications are incorporated herein by reference.

BACKGROUND OF THE INVENTION

1. Field of the Invention

The present invention relates to a method for driving a display panel and a related display driver circuit, and more particularly, to a method for driving a display panel and a related display driver circuit for reducing power consumption.

2. Description of the Prior Art

A display driver and data lines of an organic light-emitting diode (OLED) display panel has one-to-multiple application, where each output channel of the display driver may output voltages to multiple data lines on the OLED display panel in a time division manner. Therefore, a multiplexer (MUX) may be disposed on the OLED display panel to switch the output of the display driver to different data lines time-divisionally. The MUX may be controlled to sequentially transmit data voltages to the data lines in every horizontal line period, and the corresponding electric charges are stored in the parasitic capacitors on the data lines. Gate control switches (i.e., scan switches) of the OLED display panel are then turned on to allow the data voltages on the data lines to be input to the pixels, through charge sharing.

Conventionally, an OLED display panel may be deployed with or without a pre-charge operation depending on the requirement to display quality, and hence there are two control timing schemes regarding the OLED display panel called a pre-charge off scheme and a pre-charge on scheme. The pre-charge operation is pre-charging the voltages of the data lines to an appropriate level, by turning on all of switches of the MUX in a same short period, before switches of the MUX are sequentially turned on for outputting data voltages in a horizontal line period. Deploying the pre-charge operation may achieve a better visual effect for the OLED display panel.

For each horizontal line period in which data voltages of a horizontal line are output to be displayed, the display driver may control the MUX in a predetermined manner according to a determined control timing scheme of the OLED display panel, so as to transmit the data voltages to the corresponding pixels through switching of the switches in the MUX based on the determined control timing scheme. However, no matter which control timing scheme is applied, the switches in the MUX are required to change state a great number of times during the transmission of data voltages, and every time the state of the switch changes (i.e., toggle, as being switched from on-state to off-state, or from off-state to on-state), power consumption is generated. In such a situation, since there are usually a large number of MUXs on the display panel and the switches in each MUX are continuously switched, a great amount of power consumption is unavoidable.

SUMMARY OF THE INVENTION

It is therefore an objective of the present invention to provide a method for driving a display panel and a related display driver circuit which are capable of reducing the power consumption by decreasing the toggling of the switches in the multiplexer (MUX), so as to solve the abovementioned problems.

An embodiment of the present invention discloses a method for a display driver circuit. The display driver circuit is configured to drive a display panel comprising a multiplexer. The method comprises steps of: sending, by the display driver circuit, a plurality of first data voltages to the display panel through a switch of the multiplexer; and outputting, by the display driver circuit, a control signal to the switch during a first period in which the plurality of first data voltages sent through the switch remain unchanged, wherein the control signal controls the switch to be turned on and keep in a conducted status until the display driver circuit sends a second data voltage different from the plurality of unchanged first data voltages through the switch.

Another embodiment of the present invention discloses a display driver circuit for driving a display panel comprising a multiplexer. The display driver circuit comprises an output buffer and a data controller. The output buffer is configured to send a plurality of first data voltages to the display panel through a switch of the multiplexer. The data controller, coupled to the output buffer, is configured to output a control signal to the switch during a first period in which the plurality of first data voltages sent through the switch remain unchanged, wherein the control signal controls the switch to be turned on and keep in a conducted status until the output buffer sends a second data voltage different from the plurality of unchanged first data voltages through the switch.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
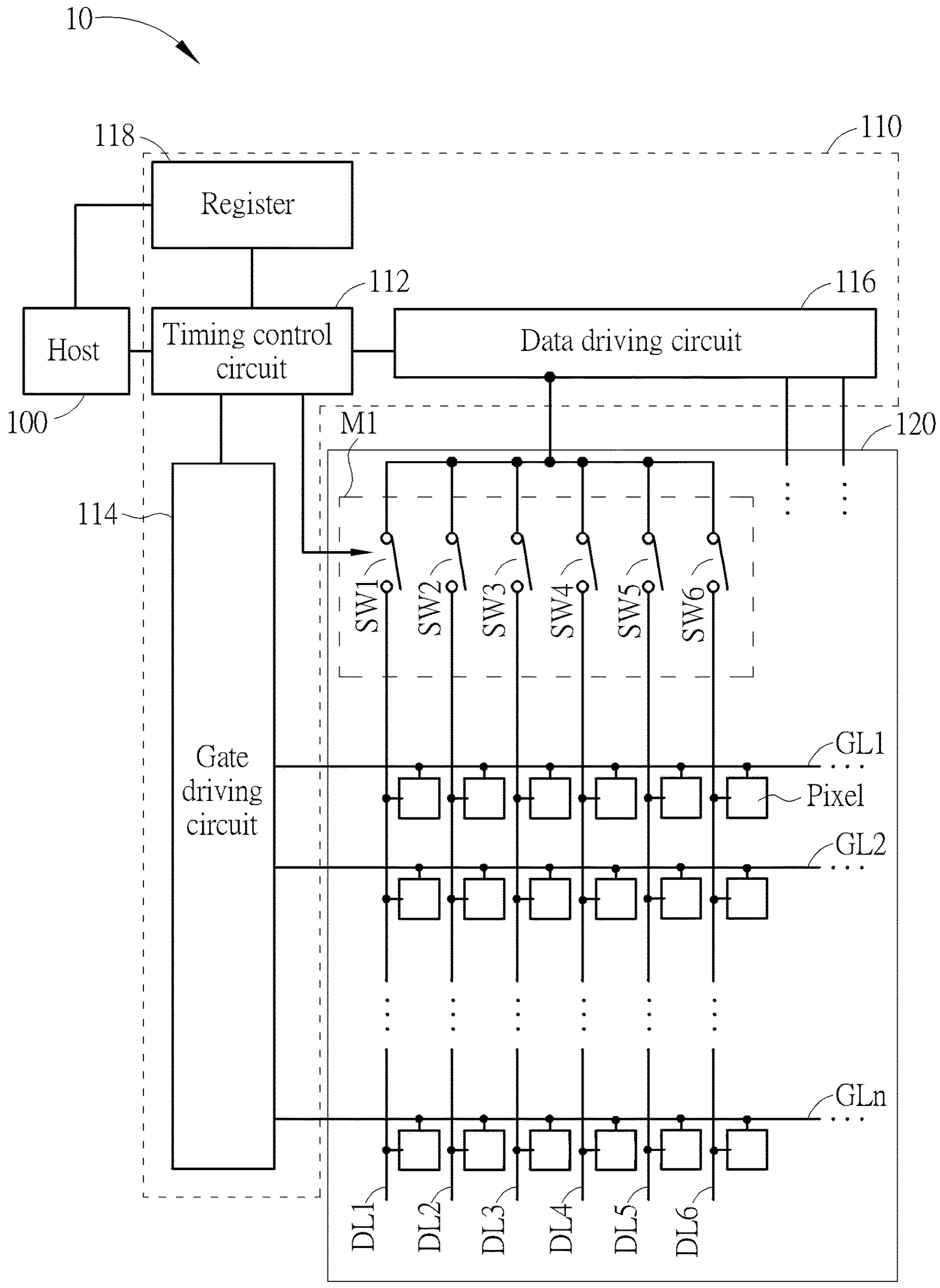
FIG. 1 is a schematic diagram of a display system according to an embodiment of the present invention.

FIG. 1 is a schematic diagram of a display system 10 according to an embodiment of the present invention. As shown in FIG. 1, the display system 10 includes a host device 100, a display driver circuit 110 and a display panel 120. The display system 10 may be implemented in an electronic device having display functions such as a laptop, mobile phone, or wearable electronic device. The host device 100 may provide information of the operation mode of the electronic device for the display driver circuit 110. When receiving the operation mode information, the display driver circuit 110 may determine the control timing scheme for the display panel 120 based on the operation mode of the electronic device. The display driver circuit 110 then outputs various control signals to the display panel 120 according to the control timing scheme.

In the embodiments of the present invention, the host device 100 may be, but not limited to, an application processor (AP), a central processing unit (CPU), a microprocessor, or a micro control unit (MCU). The display driver circuit 110 may be the circuitry implemented in a display driver integrated circuit (DDIC), an application specific integrated circuit (ASIC), a field programmable gate array (FPGA), or other programmable logic devices. Alternatively, the display driver circuit 110 may include multiple chips implemented on a circuit board and cooperating to control the display panel 120. The display panel 120 may be, but not limited to, an organic light-emitting diode (organic-LED, OLED) display panel (which may be any size, such as mini-OLED display panel or micro-OLED display panel). In other case, the display panel 120 may be a mini-LED display panel or a micro-LED display panel.

In detail, the display driver circuit 110 includes a timing control circuit 112, a gate driving circuit 114, a data driving circuit 116 and a register 118. The timing control circuit 112 is configured to control the operations of the gate driving circuit 114 and the data driving circuit 116. The gate driving circuit 114 is configured to output gate control signals to the gate lines (e.g., GL1-GLn) on the display panel 120. In some embodiments, the data driving circuit 116 includes a gate driving control circuit which is implemented in the semiconductor chip as the display driver circuit 110 and a gate on array (GOA) circuit in the display panel 120. The gate driving control circuit generates clock signals and synchronization signals output to the GOA circuit and utilized by the GOA circuit accordingly, such that the GOA circuit generates the gate control signals. The data driving circuit 116, or called the source driving circuit, is configured to output display data voltages to the data lines (e.g., DL1-DL6) on the display panel 120. The display data may be provided from the host device 100. More specifically, the timing control circuit 112 may receive the source display data from the host device 100 and store the display data in the register 118, which may be realized with a latch circuit. The register 118 may be integrated with or independent to the timing control circuit 112. The timing control circuit 112 may perform necessary video processing on the display data, and then send the display data to the data driving circuit 116. The timing control circuit 112 then controls the data driving circuit 116 to output the data voltages corresponding to the display data with the control timing scheme determined based on the operation mode, and correspondingly controls the gate driving circuit 114 to output the gate control signals.

The display panel 120 includes a display pixel array, where each pixel is controlled by the gate driving circuit 114 through one of the gate lines GL1-GLn and controlled by the data driving circuit 116 through one of the data lines such as DL1-DL6. The gate driving circuit 114 may sequentially turn on the gate control switches (i.e., scan switches) in the pixels by the gate control signals, so that the data voltages from the data driving circuit 116 may be input to the pixels through the data lines DL1-DL6.

As shown in FIG. 1, each of data output terminals of the data driving circuit 116 and data lines of the display panel 120 that the display driver circuit 110 drives has a one-to-multiple relationship. That is, one data output terminal of the data driving circuit 116 may output data voltages to multiple data lines on the display panel 120 in a time divisional manner. In this embodiment, each data output terminal of the data driving circuit 116 is configured to output display data voltages to multiple data lines DL1-DL6 and multiple columns of pixels. Transmission of the data voltages may be controlled through a multiplexer (MUX) M1 implemented in the display panel 120. In this embodiment, the MUX M1 has a 1-to-6 structure, so that each data output terminal may output data voltages to 6 data lines DL1-DL6 in a time-division manner. The MUX M1 includes 6 switches SW1-SW6 coupled to the data lines DL1-DL6, respectively. The switches SW1-SW6 are well controlled to allow the data driving circuit 116 to time-divisionally output the data voltages to the pixels in the display panel 120. In an embodiment, the timing control circuit 112 may output control signals to control the operations of the switches SW1-SW6, and correspondingly control the data driving circuit 116 to perform data driving, as shown in FIG. 1.

Please note that the implementation of the MUX M1 as shown in FIG. 1 is merely one of various embodiments of the present invention. In another embodiment, the MUX M1 may include different quantities of switches, and thus a data output terminal of the data driving circuit 116 may output data voltages to 8, 10, or any number of data lines. In addition, FIG. 1 only shows partial pixels in the display panel 120. In fact, the pixel array of the display panel 120 may include hundreds or thousands rows and hundreds or thousands columns of display pixels, and there may be multiple MUXs having structures identical to the MUX M1 deployed in the display panel 120.

Figure 2:
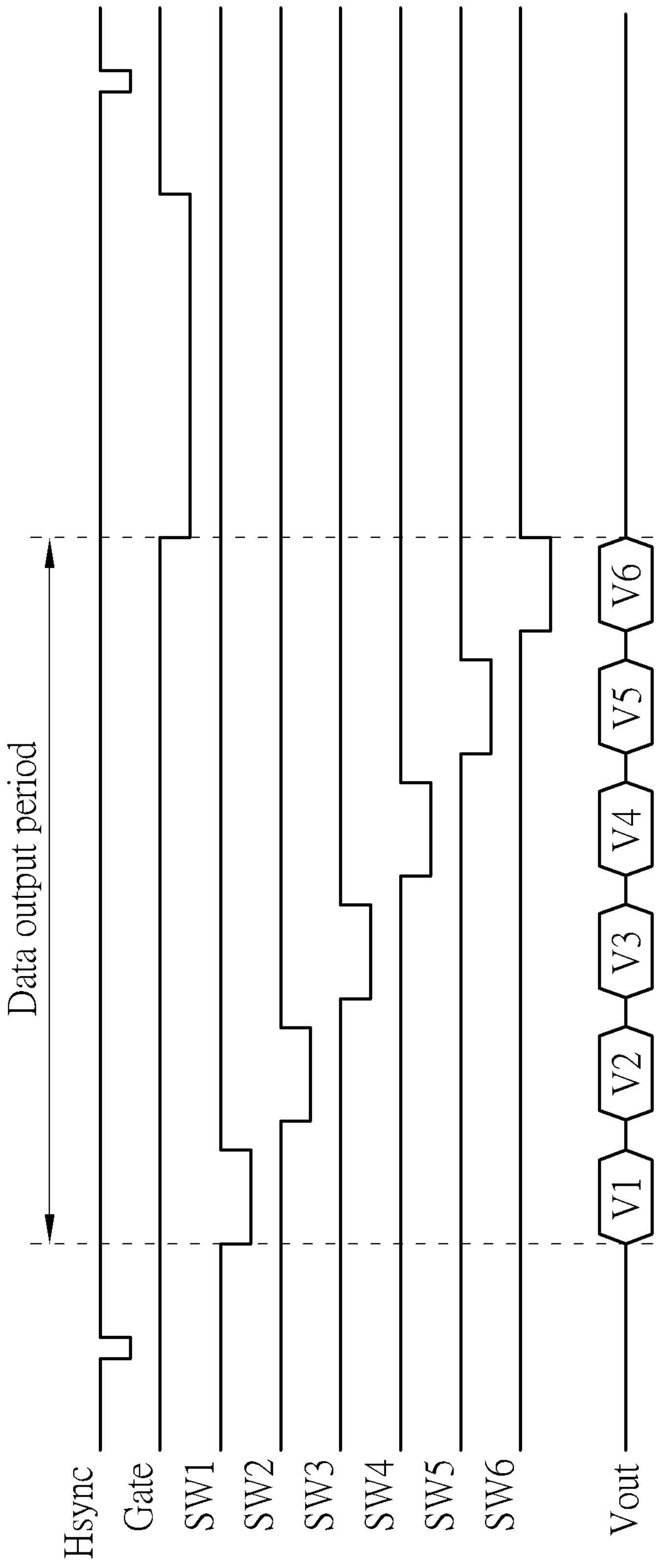
FIG. 2 is a timing diagram of the pre-charge off scheme.

The control timing schemes applicable to the display panel 120 may include a pre-charge off scheme and a pre-charge on scheme. In the pre-charge off scheme, a horizontal line period (i.e., a period during which a row of pixels (also called a horizontal line or a display line) are turned on to receive the display data voltages) includes a data output period, in which the data driving circuit 116 outputs the data voltages time-divisionally, and in the horizontal line period there is no pre-charge period included, based on the pre-charge off scheme. Please refer to FIG. 2, which is a timing diagram of the pre-charge off scheme. FIG. 2 illustrates the waveforms of a horizontal synchronization signal (Hsync), the gate control signal (Gate) transmitted to a gate line to turn on/off scan switches in the pixels (or called pixel circuits) of the present horizontal line, the control signals for turning on/off the switches SW1-SW6, and the data voltages Vout output from the data driving circuit 116. As shown in FIG. 2, the signals in the low logic status or low voltage level may turn on (or connect) the target switch or transistor, and in the high logic status or high voltage level may turn off (or disconnect) the target switch or transistor.

Referring to FIG. 2 along with FIG. 1, a pulse of the horizontal synchronization signal Hsync indicates the start of each horizontal line period. During the data output period, the data driving circuit 116 outputs data voltages V1-V6 time-divisionally. Meanwhile, the switches SW1-SW6 of the MUX M1 are turned on in sequence, allowing the data voltages V1-V6 to be forwarded to the data lines DL1-DL6, respectively. The electric charges corresponding to the data voltages V1-V6 are thereby stored in the parasitic capacitors of the data lines DL1-DL6. Subsequently, after the switches SW1-SW6 are turned off, the gate control signal Gate may turn on the gate control switch (e.g., which may be implemented with a thin-film transistor (TFT)) in the pixels. In this embodiment, the driving transistor is a P-type transistor which is turned on by a control signal in a low voltage level. As a result, the data voltages V1-V6 stored on the data lines DL1-DL6 may be transferred to the corresponding pixels through charge sharing.

Figure 3:
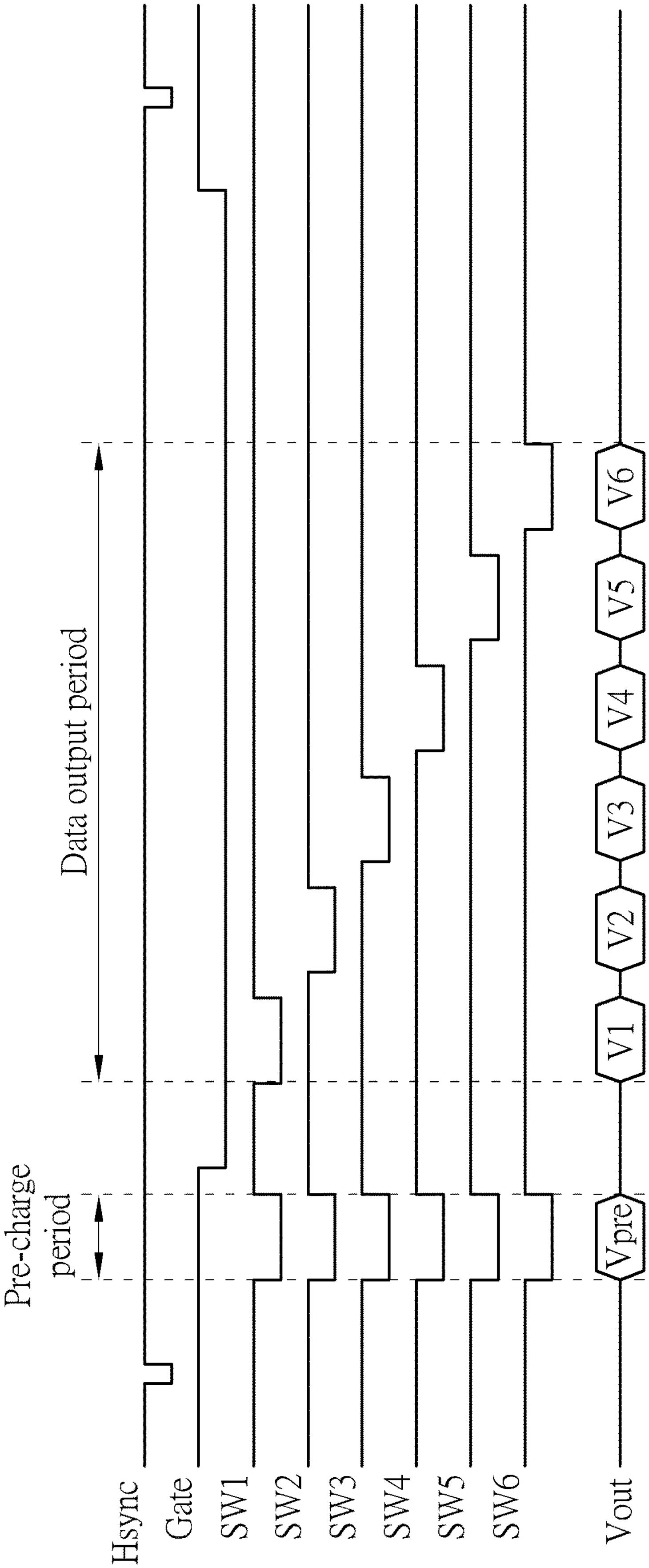
FIG. 3 is a timing diagram of the pre-charge on scheme.

Please refer to FIG. 3, which is a timing diagram of the pre-charge on scheme. As shown in FIG. 3, gate control switches of the pixels of the horizontal line are simultaneously turned on by the gate control signal Gate and the gate control switches of the pixels keep in the turn-on state during the entire data output period where the data driving circuit 116 outputs the data voltages V1-V6 time-divisionally. Therefore, the data voltages V1-V6 may be directly input to the corresponding pixels instead of being temporarily stored in the parasitic capacitors of the data lines DL1-DL6. However, when the gate control switch in a pixel is turned on but the corresponding switch in the MUX M1 is not yet turned on, the residual charges (corresponding to the previous data voltage) on the corresponding data line will be input to the pixel first, such that the voltage in the pixel may reach a higher voltage level. In such a situation, due to the diode-connected structure in the pixel, the present data voltage cannot be input to the pixel if its voltage level is lower than the voltage in the pixel.

Therefore, the pre-charge on scheme further includes a pre-charge period prior to the data output period. More specifically, within the horizontal line period indicated by the horizontal synchronization signal Hsync, a pre-charge period is allocated before the data output period. In the pre-charge period, the gate control signal Gate keeps the scan switches of a horizontal line in the turn-off state; and meanwhile, the switches SW1-SW6 of the MUX M1 are in the turn-on state simultaneously, and the data driving circuit 116 applies a pre-charge voltage Vpre to each of the data lines DL1-DL6, to clear the residual charges on the data lines DL1-DL6. In a preferable embodiment, the switches SW1-SW6 may receive the same control signal to be turned on and turned off simultaneously in the pre-charge period. The control signal may be received from the timing control circuit 112, as shown in FIG. 1.

Figure 4:
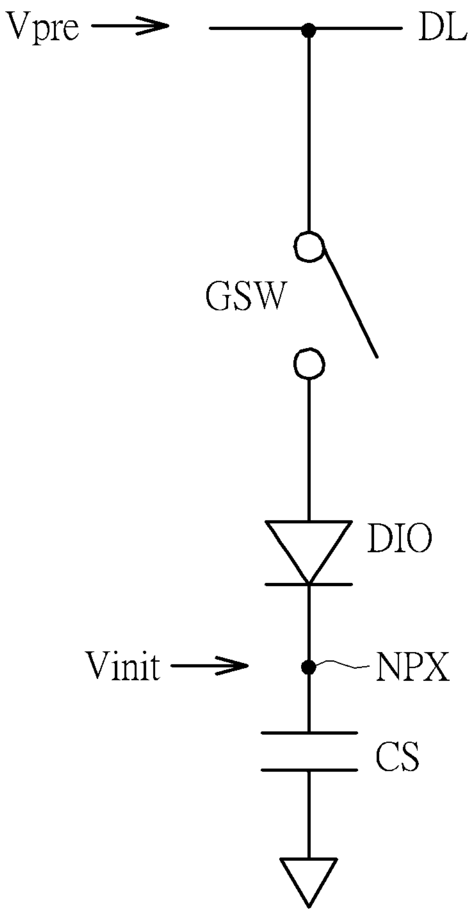
FIG. 4 and FIG. 5 are schematic diagrams of an equivalent circuit model of a display pixel.

Please refer to FIG. 4, which is a schematic diagram of an equivalent circuit model of a display pixel. The equivalent circuit model represents the pixel in the data writing phase, where an LED pixel with a P-type driving transistor is taken as an example. As shown in FIG. 4, the equivalent circuit of the pixel includes a storage capacitor CS, a diode DIO and a gate control switch GSW. The pixel is connected to a data line DL for receiving the display data voltage, where the data line DL may be any of the data lines DL1-DL6 on the display panel 120 as shown in FIG. 1. The gate control switch GSW is used to turn on or turn off the pixel by receiving the gate control signal Gate from the gate driving circuit 114. The diode DIO refers to the diode-connected structure composed of the driving transistor and the compensation transistor of the pixel. The storage capacitor CS is configured to store the electric charges corresponding to the data voltage, which is used to drive the driving transistor in the pixel to output currents to the LED to emit light.

Referring to FIG. 4 along with the waveform shown in FIG. 3, when the previous data voltage is completely transmitted, the voltages of the data line DL and the node NPX in the pixel may both reach the previous data voltage. Subsequently, before the present data voltage is output, the electric charges stored in the storage capacitor CS need to be cleared in the initial phase. For example, the voltage level of the node NPX may be controlled to drop to a lower voltage such as the zero voltage through an initial signal Vinit. After the initial phase ends and the data writing phase starts, the gate control signal Gate turns on the gate control switch GSW before the switches SW1-SW6 of the MUX M1 are turned on (as shown in FIG. 3). With the turned-on gate control switch GSW, the residual charges on the data line DL and the node NPX will perform charge sharing to reach the same voltage level. Since the capacitance value of the parasitic capacitor of the data line DL is usually much greater than the capacitance value of the storage capacitor CS in the pixel (because the length of the data line DL should span a whole column of pixels), the node NPX will reach a voltage level close to the level of the data line DL after charge sharing. If there is no pre-charge operation before the driving transistor is turned on, the voltage of the node NPX will increase during charge sharing if the previous display data voltage has a higher value, causing that the next lower display data voltage fails to pass through the diode-connected circuit to be input to the pixel.

Therefore, it is necessary to allocate a pre-charge period and apply a pre-charge voltage to avoid the above situation. As shown in FIG. 3, in the pre-charge period before the gate control signal Gate turns on the pixel, the switches SW1-SW6 are turned on simultaneously and the data driving circuit 116 outputs the pre-charge voltage Vpre to the data lines DL1-DL6, allowing the voltage level of the data lines DL1-DL6 to reach the pre-charge voltage Vpre. The pre-charge voltage Vpre may have a lower enough value that allows the subsequent data voltages V1-V6 output in the following data output period to be successfully written into the pixels. More specifically, the pre-charge voltage Vpre may have any appropriate voltage value lower than the minimum of the data voltages V1-V6 with a margin equal to or greater than the threshold voltage of the driving transistor in the diode-connected circuit.

Figure 5:
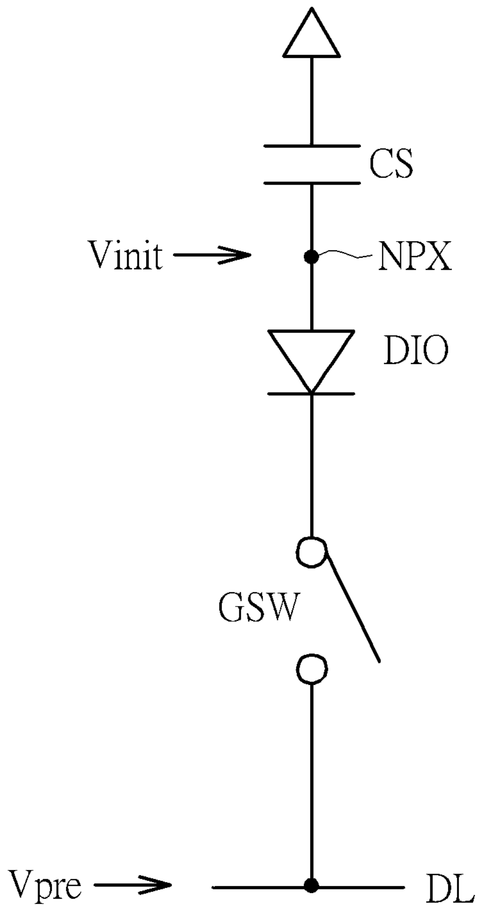

The pre-charge operation is generally applied to an OLED display panel. FIG. 4 illustrates an embodiment having a P-type driving transistor used to drive the LEDs (e.g., OLEDs), and thus the pre-charge voltage Vpre is requested to be lower than the data voltages V1-V6. In another embodiment, the control timing of the pre-charge on scheme may also be applied to a display pixel in which the LED is driven through an N-type transistor, as the equivalent circuit model shown in FIG. 5. Note that the pre-charge voltage Vpre for the N-type driven pixel should be in a higher voltage level. More specifically, the pre-charge voltage Vpre may have any appropriate voltage value higher than the maximum of the data voltages V1-V6 with a margin equal to or greater than the threshold voltage of the driving transistor. The higher pre-charge voltage Vpre will push the data line DL to a higher level in the pre-charge period, to keep the node NPX at a higher level after charge sharing, so as to avoid that the diode-connected structure of the pixel fails to be turned on by the subsequent data voltages V1-V6.

As can be seen, the abovementioned pre-charging operation may essentially be pre-charging or pre-discharging, depending on the design of the pixel circuit. The above pre-charging operation may be regarded as a reset operation of the voltages of the data lines.

FIG. 2 and FIG. 3 illustrate the control timing of the pre-charge off scheme and the pre-charge on scheme, respectively. Their main difference is that, in the pre-charge off scheme, the switches SW1-SW6 of the MUX M1 are turned off when the gate control switch GSW is turned on, so the pixels are charged through the electric charges on the data lines DL1-DL6, and the light emission is determined based on the quantities of electric charges sent to the pixels. In the pre-charge on scheme, the switches SW1-SW6 of the MUX M1 and the gate control switch GSW are in the turn-on state at the same time, so the data voltages V1-V6 from the data driving circuit 116 may directly charge the pixels, and the residual charges on the data lines DL1-DL6 are cleared or reset through the pre-charge voltage Vpre in the pre-charge period prior to the charging operation of the data voltages V1-V6.

As shown in FIG. 2 and FIG. 3, in the pre-charge on scheme, each switch has to toggle (including turn-on and turn-off) 4 times in each horizontal line period; and in the pre-charge off scheme, each switch has to toggle (including turn-on and turn-off) 2 times in each horizontal line period. In order to reduce the toggling number of times of the switch, the present invention proposes a MUX control method, which may adjust the switching of the MUX according to the image content, so as to reduce the overall toggling number of times of the switches, thereby reducing the power consumption generated from the toggling of the switches.

In an embodiment, when the display driver circuit 110 determines that the data voltages output by the same MUX (e.g., M1) are all equal among two or more consecutive horizontal line periods, the display driver circuit 110 may control the MUX M1 to enter the power saving mode. In the power saving mode, the switches SW1-SW6 in the MUX M1 keep staying in the turn-on state; that is, the display driver circuit 110 provides control signals to control the switches SW1-SW6 to be continuously conducted, where the timing of writing the data voltages into the pixels is not affected, and the image display is not affected since all data voltages output from the data driving circuit 116 through the switches SW1-SW6 of the MUX M1 during these horizontal line periods all equal. In this way, by continuously conducting the switches SW1-SW6 for more than 2 horizontal line periods, the toggling number of times of the switches may be reduced. When determining that the situation of "the data voltages output by the same MUX are all equal among consecutive horizontal display lines" no longer exists, the display driver circuit 110 may recover the control timing for the MUX M1 to be as in the original non-power saving mode, such as the control timing of the pre-charge on or pre-charge off schemes described above.

Figure 6:
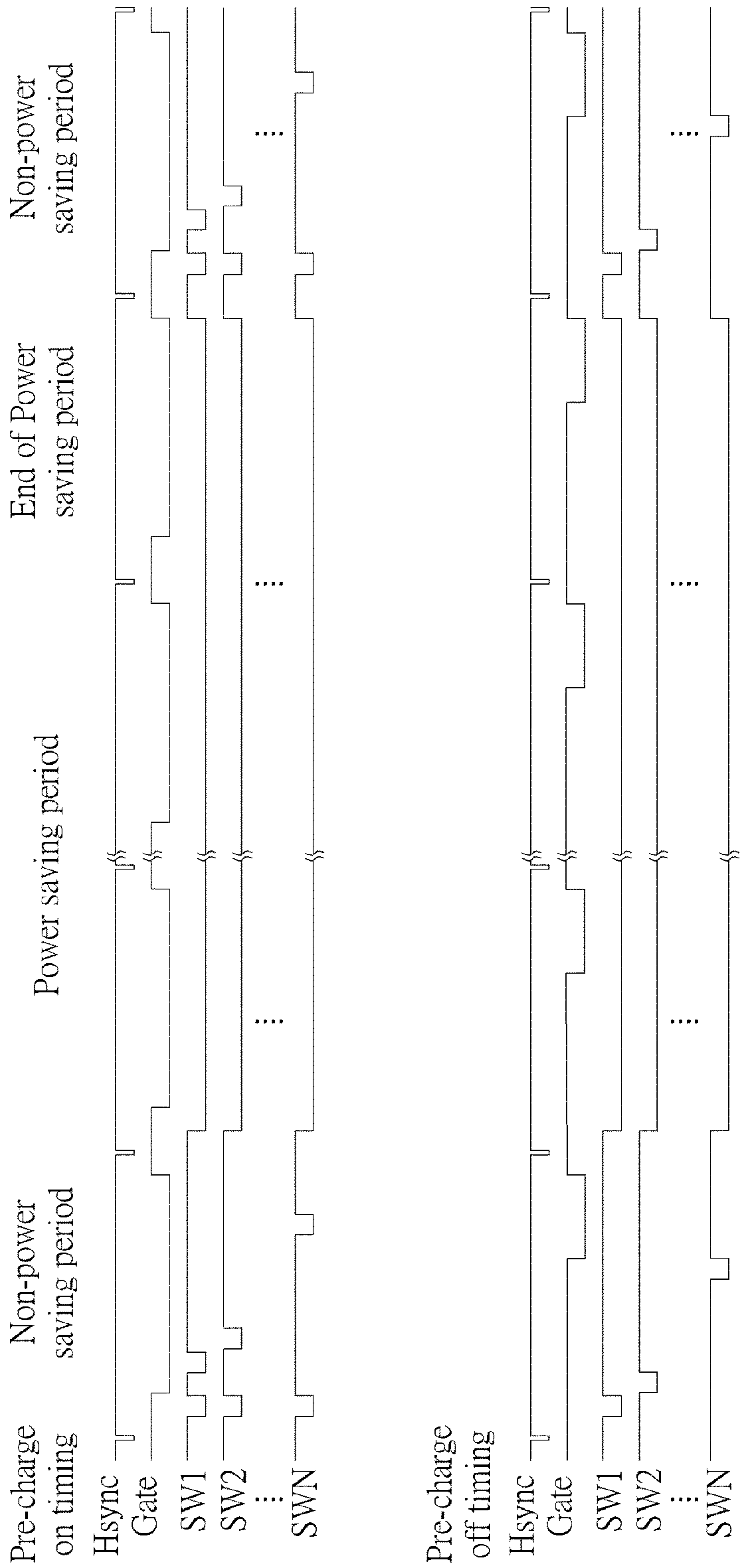
FIG. 6 illustrates the waveforms of control signals for the MUX and other related signals in the power saving period and the non-power saving period according to an embodiment of the present invention.

FIG. 6 illustrates the waveforms of control signals for the MUX and other related signals (i.e., the horizontal synchronization signal Hsync and the gate control signal Gate) in the power saving period and the non-power saving period according to an embodiment of the present invention. The power saving period is a time period in which the MUX is operated in the power saving mode, and the non-power saving period is a time period in which the MUX is operated in the non-power saving mode. In this embodiment, the MUX has N switches SW1-SWN, where N may be any positive integer. As shown in FIG. 6, during the non-power saving period, the switches SW1-SWN toggle following a predetermined timing scheme (such as the operations shown in FIGS. 2 and 3), and the display driver circuit sequentially sends the data voltages to the corresponding data lines and pixels. After the power saving period starts, the switches SW1-SWN are turned on and remain in the turn-on state until the end of the power saving period. During this power saving period, there is no unnecessary toggling of the switches. FIG. 6 shows the control timing of the pre-charge on scheme and the pre-charge off scheme. Both of these control timing schemes can apply the method of extending the on time of the switches to reduce toggling.

Please note that all the switches SW1-SWN are in the turn-on state simultaneously, which means that the data voltage is sent to the data line and pixel corresponding to each switch at the same time. In order to prevent the image display from being affected, the display driver circuit needs to detect the image content to be displayed, and the power saving mode should only be enabled under specific image content that would not be affected by this power saving operation of toggle reduction.

Figure 7:
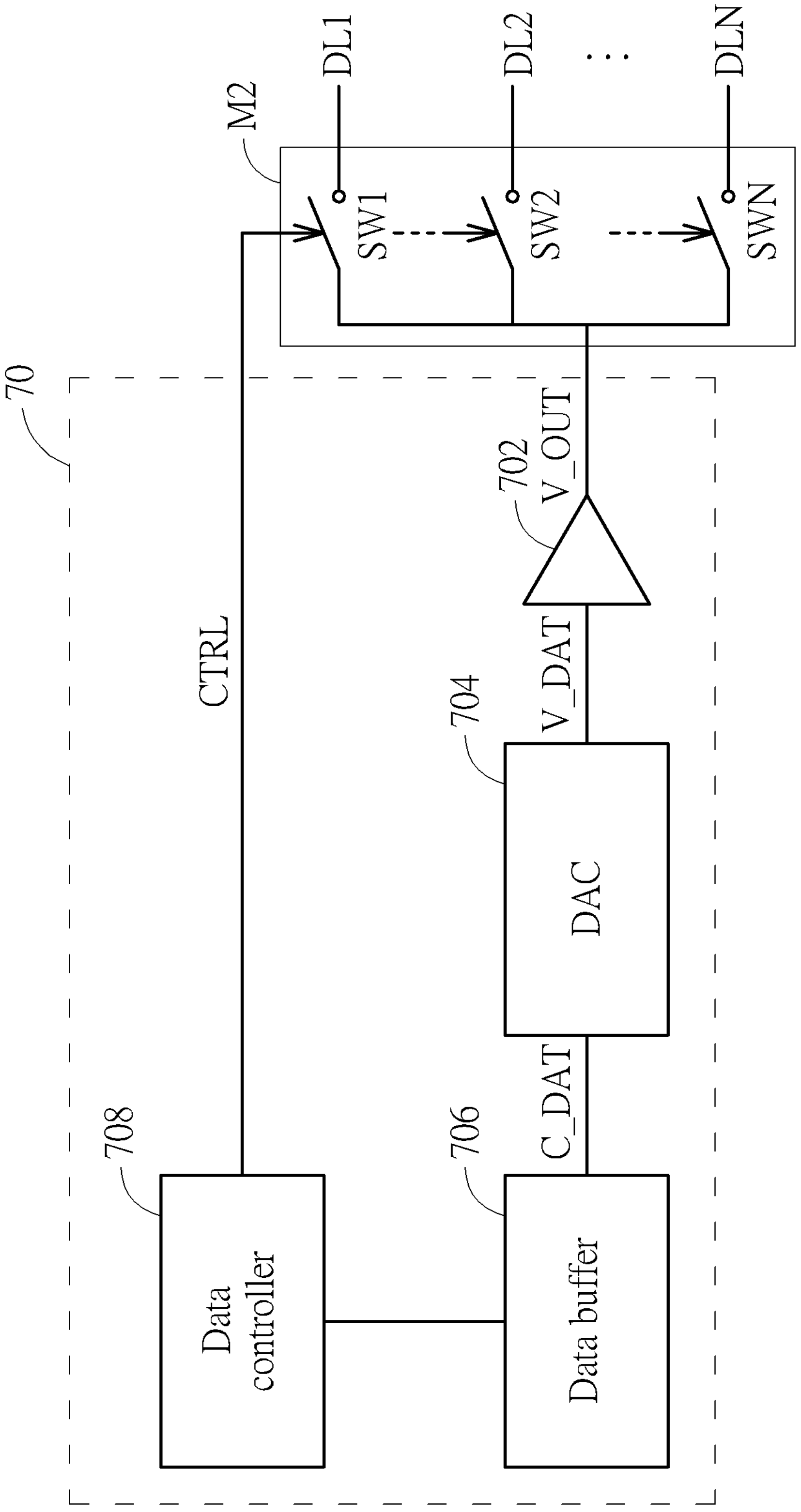
FIG. 7 is a schematic diagram of a display driver circuit according to an embodiment of the present invention.

Please refer to FIG. 7, which is a schematic diagram of a display driver circuit 70 according to an embodiment of the present invention. As shown in FIG. 7, the display driver circuit 70 includes an output buffer 702, a digital-to-analog converter (DAC) 704, a data buffer 706 and a data controller 708. A MUX M2, which may not be included in the display driver circuit 70 but included in the display panel, is shown in FIG. 7 to facilitate the illustrations.

In detail, the output buffer 702 is configured to send output voltages V_OUT to a group of data lines DL1-DLN in the display panel through the MUX M2 during each horizontal line period. The output buffer 702 may be an operational amplifier capable of providing enough driving capability for driving the data lines DL1-DLN in the display panel. The DAC 704, coupled to the output buffer 702, is configured to generate data voltages V_DAT according to corresponding data codes C_DAT. The data codes C_DAT may be stored in the data buffer 706 before received and processed by the DAC 704. The data buffer 706 may be, for example, the data latches in the data driving circuit or the register of the timing control circuit, but not limited thereto. The data controller 708 may determine the data codes C_DAT stored in the data buffer 706, and output a control signal CTRL to control the switches SW1-SWN of the MUX M2 accordingly. In an embodiment, the data controller 708 may be a logic circuit module included in the timing control circuit.

In an embodiment, the DAC 704 may generate the data voltages V_DAT based on the whole data codes C_DAT; and correspondingly, the output buffer 702 may forward the data voltages V_DAT as the output voltages V_OUT to the display panel. In another embodiment, the DAC 704 may receive the data codes C_DAT and generate the data voltages V_DAT according to a first part of the data codes C_DAT. Upon receiving the data voltages V_DAT from the DAC 704, the output buffer 702 may generate the output voltages V_OUT through interpolation based on the data voltages V_DAT and also based on a second part of the data codes C_DAT. For example, if the DAC 704 is a 6-bit DAC but it needs to process 10-bit data codes C_DAT, the 6 higher bits of the data codes C_DAT may be provided for the DAC 704 to generate the data voltages V_DAT. The output buffer 702 may receive the data voltages V_DAT and the information of the 4 lower bits of the data codes C_DAT, to interpolate and generate the output voltages V_OUT to be output to the display panel based on the lower bit information of the data codes C_DAT.

In order to prevent the image display from being affected by the power saving operation, the data controller 708 may determine whether the data codes corresponding to the data voltages to be output through the same MUX (e.g., M2) during the same horizontal line period equal. As shown in FIG. 6, the switches SW1-SWN are simultaneously in the turn-on state in the power saving period; hence, the output voltages V_OUT to be output to a row of pixels through the MUX M2 in the same horizontal line period should all equal, so that the display image may not be affected when the turn-on periods of the switches SW1-SWN are extended and overlap. In such a situation, the data codes C_DAT corresponding to the output voltages V_OUT may also equal.

In addition, the data controller 708 may also determine whether the data codes corresponding to the data voltages to be output through the same MUX (e.g., M2) during several consecutive horizontal line periods equal. For example, the output buffer 702 is configured to output a plurality of first output voltages to the data lines DL1-DLN through the MUX M2 during a first horizontal line period, where the first output voltages correspond to (e.g., be converted from, either by the DAC 704 or by the output buffer 702 through interpolation) a plurality of first data codes. The output buffer 702 is also configured to output a plurality of second output voltages to the data lines DL1-DLN through the MUX M2 during a second horizontal line period which is immediately after the first horizontal line period, where the second output voltages correspond to (e.g., be converted from, either by the DAC 704 or by the output buffer 702 through interpolation) a plurality of second data codes. Therefore, the data controller 708 may determine whether any one or more of the first data codes equal the corresponding second data code(s) output through the same switch(s), thereby determining whether the turn-on period of the switch(s) may be extended throughout multiple horizontal line periods.

In an embodiment, the data controller 708 may determine whether the first data codes corresponding to the first horizontal line period all equal, and determine whether each of the first data codes equals the corresponding second data code corresponding to the second horizontal line period immediately after the first horizontal line period. In response to that both determination results are "yes", the data controller 708 may output the control signal CTRL to a switch (which may be any of the switches SW1-SWN) of the MUX M2, to keep the switch staying in the turn-on state after the switch is turned on for outputting or forwarding the first output voltage in the first horizontal line period. In other words, the switch may stay in the turn-on state from being turned on to the end of the first horizontal line period.

When the data controller 708 determines that the first data codes corresponding to the first horizontal line period all equal and also determines that each of the first data codes equals the corresponding second data code corresponding to the second horizontal line period (i.e., the next horizontal line period), the power saving period may start from the first horizontal line period. In other words, the switch may be turned on in the first horizontal line period, and the on time may be extended to at least the end of the second horizontal line period. As a result, based on the above two types of data determinations performed on the data codes to be displayed in each horizontal line period by the data controller 708, the power saving period (i.e., the switch staying in the turn-on state instead of switching between on/off states) may last until at least one of the determination results of the above two types of data determinations is "no".

If the power saving period starts from another horizontal line period prior to the first horizontal line period, the switch may be turned on and in a previous horizontal line period, and stay in the turn-on state to the first horizontal line period. In such a situation, the data controller 708 may determine whether the first data codes corresponding to the first horizontal line period all equal, and determine whether each of the first data codes equals the corresponding second data code corresponding to the second horizontal line period, so as to determine whether to further extend the turn-on period of the switch (i.e., stay in the power saving mode) or turn off the switch (i.e., exit the power saving mode and enter the non-power saving mode).

Therefore, the data controller 708 may determine whether to control the switch to stay in the turn-on state or return to the timing control scheme of the non-power saving mode. If the data controller 708 determines that the data codes corresponding to the output voltages to be output through the MUX in the same horizontal line period do not equal, and/or determines that any of the data codes does not equal the corresponding data code for the next horizontal line period, the data controller 708 may output the control signal CTRL to turn off the switch. As shown in FIG. 6, at the end of the power saving period (i.e., in the last horizontal line period where the power saving operation is performed), the switches SW1-SWN are turned off and then restart toggling following the pre-charge on scheme or the pre-charge off scheme based on the operation mode in the next horizontal line period.

In another embodiment, in order to determine whether the data codes equal, the data controller 708 may determine whether the data codes corresponding to the output voltages to be output through the MUX during the same horizontal line period or several consecutive horizontal line periods have the same characteristics, such as correspond to the same specific grayscale (i.e., a specific data code). For example, the data controller 708 may determine whether the data codes are respectively identical to the specific data code such as the data code corresponding to the minimum grayscale value that allows the display panel to show several consecutive black lines.

As a result, the MUX M2 may enter the power saving mode when a grayscale image is displayed. This is because the data codes corresponding to three pixel colors, RGB, in the grayscale image are the same. It is not necessary to turn on/off the switches sequentially when writing the data voltages in each horizontal display line, and the pre-charge operation before writing the data voltages in the pre-charge on scheme is also unnecessary; hence, the toggling number of times of the switches may be reduced.

As can be seen, in one embodiment, before the data voltages of each horizontal display line are output, the data controller 708 detects whether the corresponding data codes for the current horizontal display line are exactly the same and identical to the data codes of the previous horizontal display line (or the next horizontal display line). Alternatively or additionally, in one embodiment, before the data voltages of each horizontal display line are output, the data controller 708 detects whether the corresponding data codes for all switches SW1-SWN in the MUX M2 are exactly the same, and when there are two or more horizontal display lines all have the same data code (and also the same data voltage), the above method of extending the on-time of the switches may be used to reduce the toggling of the switches.

It should be noted that the power saving operation may be performed under the same output voltage corresponding to the display data for a horizontal display line. This same data voltage may be from the same or different display data grayscales originally. In general, the grayscale of the original display data may undergo various signal processing operations to improve the visual effects, such as overdriving, subpixel rendering and white balance calibration, and these signal processing schemes may change the final data code to be output to the DAC and thereby change the corresponding data voltage. The image content detection of the present invention targets the final data code. In fact, the data controller of the display driver circuit does not determine the analog data voltages, but performs determination based on the digital data codes corresponding to the final output data voltages, so as to activate the MUX control in the power saving mode when the data voltages for a horizontal display line or several consecutive horizontal display lines all equal. Therefore, in an embodiment, in order to perform the equality determination, the data controller may take the data codes from the data latches of the data driving circuit, or may take the data codes from the register of the timing control circuit where the data codes have undergone the signal processing operations and are ready to be sent to the data driving circuit. In other words, the data buffer 706 shown in FIG. 7 may be the data latches included in the data driving circuit 116 or may be the register 118 as shown in FIG. 1.

Please note that the present invention aims at extending the on-time of the switches in the MUX to span across multiple horizontal line periods under a specific image (e.g., the data codes corresponding to the data voltages to be forwarded through the MUX in these horizontal line periods all equal), thereby reducing the toggling number of times of the switches. Those skilled in the art may make modifications and alterations accordingly. For example, the driving method of the power saving operation shown in FIG. 6 is one of various embodiments of the present invention, where all switches SW1-SWN are turned on and turned off simultaneously during the power saving period. In another embodiment, the turned-on/off time of the switches may be adjusted flexibly, and the reduction of toggling number of times may also be achieved.

Figure 8:
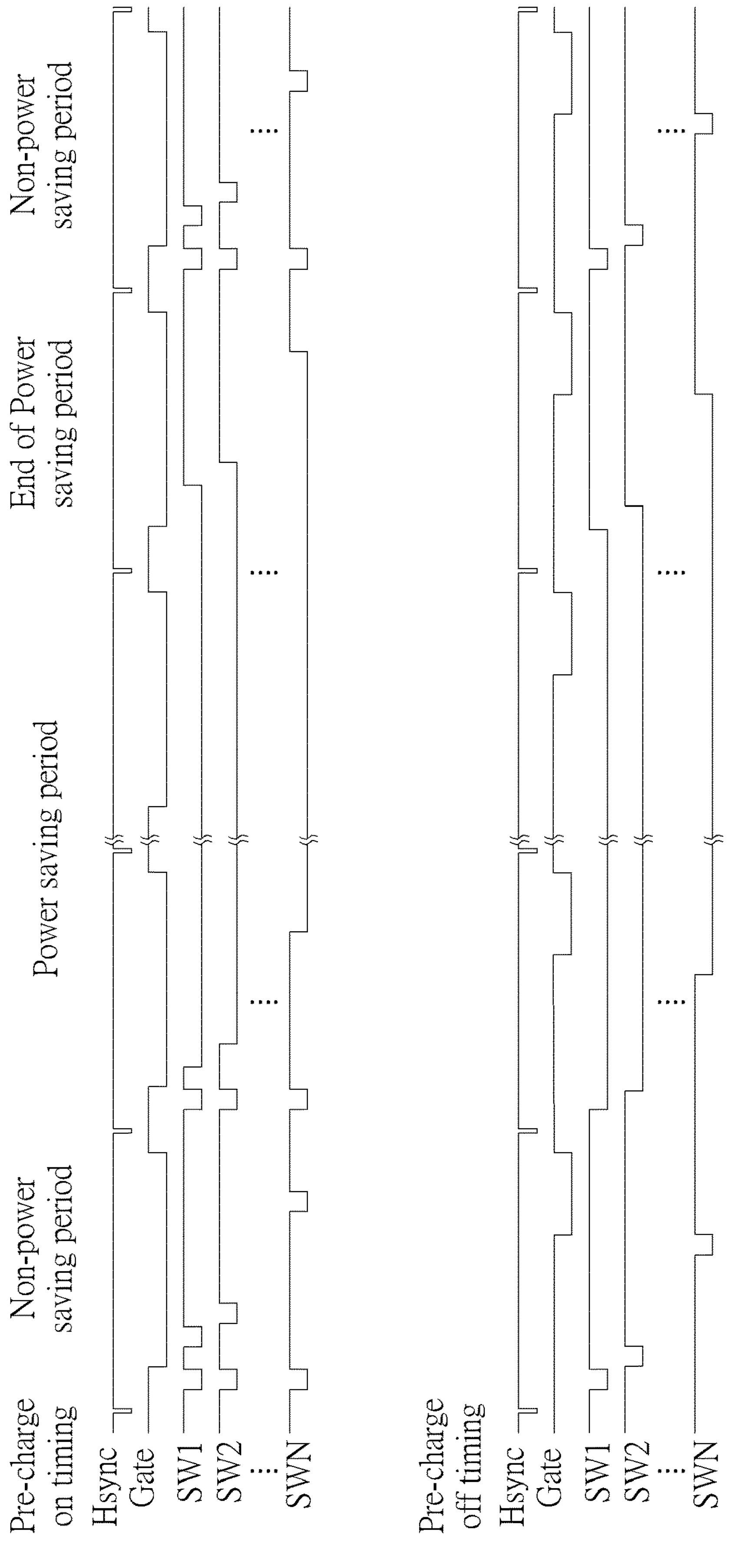
FIG. 8 illustrates the waveforms of control signals for the MUX and other related signals in the power saving period and the non-power saving period according to another embodiment of the present invention.

For example, FIG. 8 illustrates the waveforms of control signals for the MUX and other related signals in the power saving period and the non-power saving period according to another embodiment of the present invention. As shown in FIG. 8, when entering the power saving period, each switch SW1-SWN may still be turned on in sequence according to the predetermined timing of the pre-charge on/off scheme, then remain in the turn-on state until the last horizontal line period in the power saving period, and then be turned off in sequence. Regardless of whether the switches SW1-SWN are turned on/off simultaneously or sequentially, no additional toggling of the switches occurs during the power saving period, which may achieve the purpose of reducing power consumption. In other embodiments, the control method of the switches may also be simultaneous turn-on and sequential turn-off, or sequential turn-on and simultaneous turn-off, or the sequence of turning on/off the switches may be adjusted arbitrarily according to system requirements. The abovementioned alterations related to the control method all belong to the scope of the present invention.

As long as the data codes corresponding to the output voltages to be output in a specific horizontal line period are determined to equal and the data codes are determined to equal those data codes corresponding to the next horizontal line period, the switches will be controlled to stay in the turn-on state at least until the end of the specific horizontal line period. The switches will then be turned off when the data controller finds that any of the subsequent data codes appears to have different values.

Figure 9:
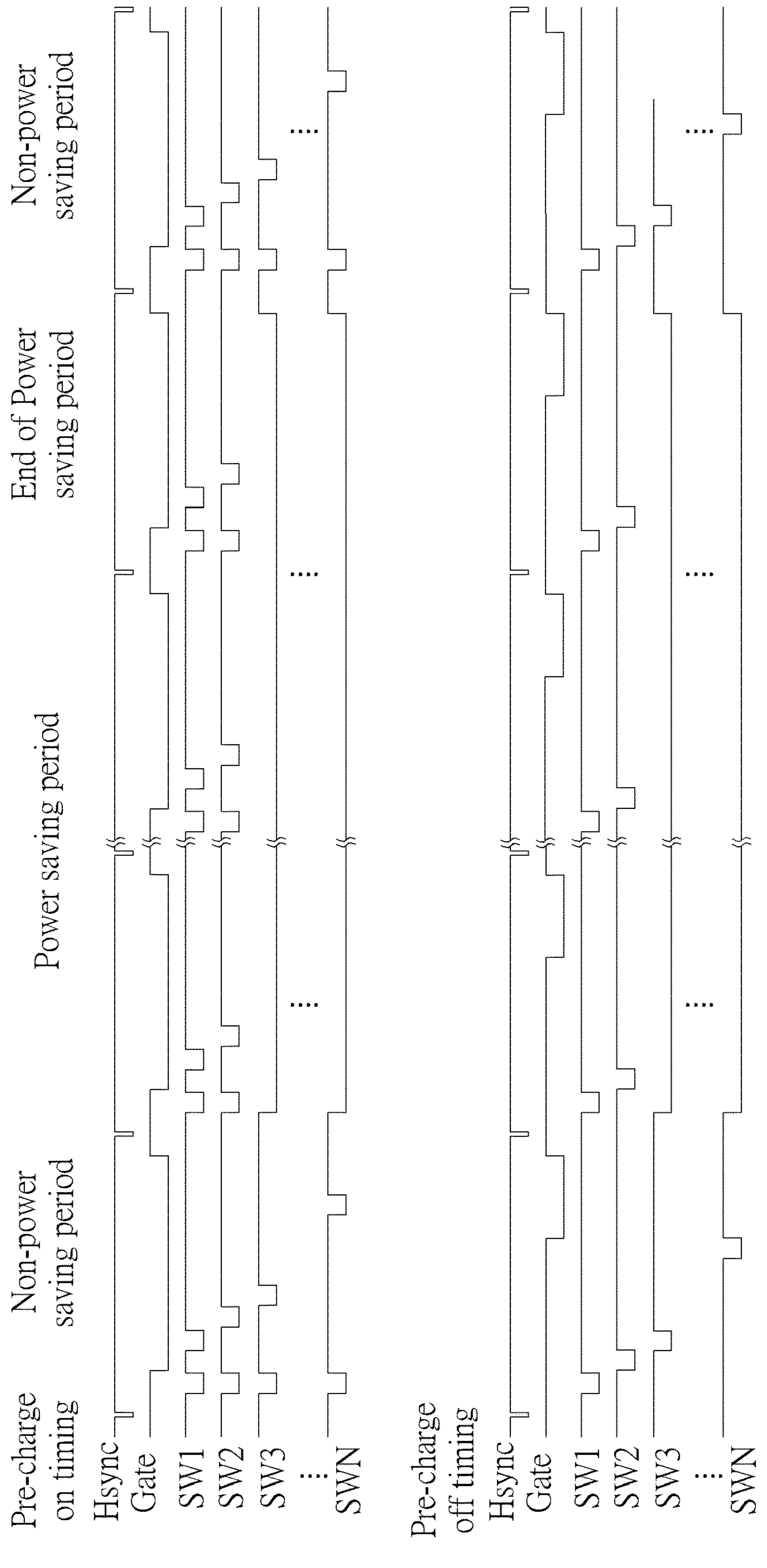
FIG. 9 illustrates the waveforms of control signals for the MUX and other related signals in the power saving period and the non-power saving period according to a further embodiment of the present invention.

In the above embodiments as shown in FIGS. 6 and 8, all of the switches SW1-SWN stay in the turn-on state and stop toggling during the power saving period. In another embodiment, it may also be possible to selectively control partial switches to stay in the turn-on state in the power saving mode, while other switches keep the predetermined control timing of the pre-charge on or pre-charge off scheme. Therefore, the data controller may only control one or several of the switches SW1-SWN to stay in the turn-on state during the power saving period. As shown in FIG. 9, during the power saving period, the on-time of the switches SW3-SWN are extended to reduce toggling, and the switches SW1 and SW2 are still operated based on the control timing as in the non-power saving period. As long as the on-time of any switch in the MUX is extended to span across multiple horizontal line periods, the related operations should belong to the scope of the present invention. In such a situation, the toggling of the switch may still be reduced, and the effects of power saving may be achieved.

Figure 10:
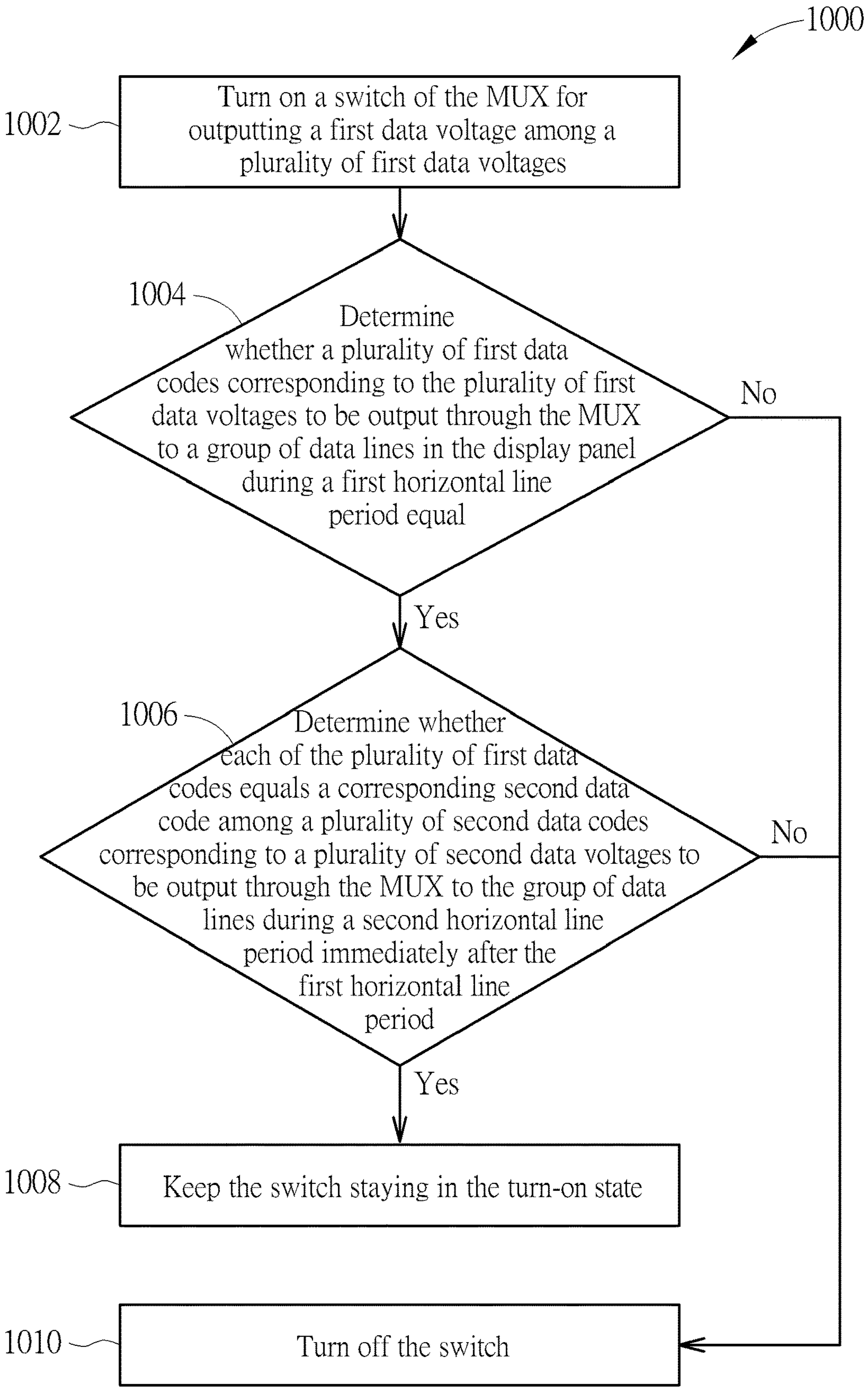
FIG. 10 is a flowchart of a process according to an embodiment of the present invention.

The abovementioned operations of the display driver circuit may be summarized into a process 1000, as shown in FIG. 10. The process 1000 may be implemented in a display driver circuit for driving a display panel, such as the display driver circuit 110 shown in FIG. 1 or the display driver circuit 70 shown in FIG. 7. As shown in FIG. 10, the process 1000 includes the following steps:

Step 1002: Turn on a switch of the MUX for outputting a first data voltage among a plurality of first data voltages.

Step 1004: Determine whether a plurality of first data codes corresponding to the plurality of first data voltages to be output through the MUX to a group of data lines in the display panel during a first horizontal line period equal. If yes, go to Step 1006; otherwise, go to Step 1010.

Step 1006: Determine whether each of the plurality of first data codes equals a corresponding second data code among a plurality of second data codes corresponding to a plurality of second data voltages to be output through the MUX to the group of data lines during a second horizontal line period immediately after the first horizontal line period. If yes, go to Step 1008; otherwise, go to Step 1010.

Step 1008: Keep the switch staying in the turn-on state.

Step 1010: Turn off the switch.

Note that the order of Step 1004 and Step 1006 is interchangeable, and Step 1008 and Step 1010 are performed based on the determination results obtained from Step 1004 and Step 1006. Other detailed operations and alterations of the process 1000 are illustrated in the above paragraphs, and will not be narrated herein.

To sum up, the present invention provides a control method for controlling the switches of the MUX used in a display panel having the one-to-multiple structure. The control timing of both the pre-charge on scheme and pre-charge off scheme requires that the switches of the MUX toggle in each horizontal line period. According to the present invention, when determining that the data codes corresponding to the data voltages output by the MUX all equal among multiple consecutive horizontal line periods, the display driver circuit controls the switches to keep staying in the turn-on state throughout these horizontal line periods after these switches are turned on to output or forward the data voltages. Therefore, the toggling number of times of the switches may be reduced, and the power consumption may be saved accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for a display driver circuit, the display driver circuit being configured to drive a display panel comprising a multiplexer, the method comprising:

sending, by the display driver circuit, a plurality of first data voltages to the display panel through a switch of the multiplexer; and outputting, by the display driver circuit, a control signal to the switch during a first period in which the plurality of first data voltages sent through the switch remain unchanged, wherein the control signal controls the switch to be turned on and keep in a conducted status until the display driver circuit sends a second data voltage different from the plurality of unchanged first data voltages through the switch;

wherein the first period extends through at least two horizontal line periods.

2. The method of claim 1, further comprising:

changing a logic level of the control signal output by the display driver circuit to turn off the switch in response to that the second data voltage is sent by the display driver circuit through the switch.

3. The method of claim 1, wherein the multiplexer comprises a plurality of switches, and data voltages sent through the plurality of switches during the first period are all equal.

4. The method of claim 3, further comprising:

outputting, by the display driver circuit, the control signal to control the plurality of switches to be turned on and keep in the conducted status during the first period.

5. The method of claim 1, wherein the multiplexer comprises a plurality of switches, and the method further comprises:

outputting, by the display driver circuit, a plurality of control signals having the same voltage level transition timing to the plurality of switches, respectively, during a horizontal line period in which a plurality of third data voltages sent to the display panel through the plurality of switches are equal, to control the plurality of switches to be turned on and keep in the conducted status until the display driver circuit sends a fourth data voltage different from the plurality of equal third data voltages through any one of the plurality of switches.

6. A display driver circuit for driving a display panel, the display panel comprising a multiplexer, the display driver circuit comprising:

an output buffer, configured to send a plurality of first data voltages to the display panel through a switch of the multiplexer; and a data controller, coupled to the output buffer, configured to output a control signal to the switch during a first period in which the plurality of first data voltages sent through the switch remain unchanged, wherein the control signal controls the switch to be turned on and keep in a conducted status until the output buffer sends a second data voltage different from the plurality of unchanged first data voltages through the switch;

wherein the first period extends through at least two horizontal line periods.

7. The display driver circuit of claim 6, wherein a logic level of the control signal output by the data controller is changed to turn off the switch in response to that the second data voltage is sent by the output buffer through the switch.

8. The display driver circuit of claim 6, wherein the multiplexer comprises a plurality of switches, and data voltages sent through the plurality of switches during the first period are all equal.

9. The display driver circuit of claim 8, wherein the data controller outputs the control signal to control the plurality of switches to be turned on and keep in the conducted status during the first period.

10. The display driver circuit of claim 6, wherein the multiplexer comprises a plurality of switches, and the data controller further outputs a plurality of control signals having the same voltage level transition timing to the plurality of switches, respectively, during a horizontal line period in which a plurality of third data voltages sent to the display panel through the plurality of switches are equal, to control the plurality of switches to be turned on and keep in the conducted status until the output buffer sends a fourth data voltage different from the plurality of equal third data voltages through any one of the plurality of switches.

* * * * *